(12) United States Patent
Otani

(10) Patent No.: US 10,760,503 B2
(45) Date of Patent: Sep. 1, 2020

(54) CONTROLLER FOR INTERNAL COMBUSTION ENGINE

(71) Applicant: TOYOTA JIDOSHA KABUSHIKI KAISHA, Aichi-ken (JP)

(72) Inventor: Toshiaki Otani, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 61 days.

(21) Appl. No.: 16/239,544

(22) Filed: Jan. 4, 2019

(65) Prior Publication Data

US 2019/0234316 A1 Aug. 1, 2019

(30) Foreign Application Priority Data

Jan. 30, 2018 (JP) ................. 2018-014056

(51) Int. Cl.
| | | |
|---|---|---|
| F02D 13/02 | (2006.01) | |
| F02D 41/10 | (2006.01) | |
| F01L 1/053 | (2006.01) | |
| F01L 1/344 | (2006.01) | |
| F02D 41/00 | (2006.01) | |

(52) U.S. Cl.
CPC .......... *F02D 13/0238* (2013.01); *F01L 1/053* (2013.01); *F01L 1/344* (2013.01); *F02D 13/0261* (2013.01); *F02D 41/0002* (2013.01); *F02D 41/10* (2013.01); *F01L 2001/0537* (2013.01); *F02D 41/0007* (2013.01); *F02D 2041/001* (2013.01); *F02D 2200/1002* (2013.01); *F02D 2250/18* (2013.01)

(58) Field of Classification Search
USPC ............... 123/90.17, 90.15; 701/102, 105
See application file for complete search history.

(56) References Cited

U.S. PATENT DOCUMENTS 5,666,931 A * 9/1997 Pierik ................. F02D 13/0215
123/568.21
6,109,225 A * 8/2000 Ogita .................. F01L 1/34406
123/90.15

(Continued)

FOREIGN PATENT DOCUMENTS

| JP | H8-14073 A | 1/1996 |
|---|---|---|
| JP | 2010-158979 A | 7/2010 |

(Continued)

*Primary Examiner* — Patrick Hamo
*Assistant Examiner* — Wesley G Harris
(74) *Attorney, Agent, or Firm* — Hauptman Ham, LLP

(57) ABSTRACT

A controller for an internal combustion engine includes a controlling section that controls a variable valve actuation device such that the phase of an intake valve becomes a target value. The controlling section executes a process of setting the target value to a steady or transient state phase, a process of calculating a load change rate, and a process of setting a change amount of the transient state phase. The change amount of the transient state phase is set to a change amount when the engine operating state is a transient state and the load change rate is greater than or equal to a predetermined threshold. The change amount of the transient state phase is set to a second change amount that is less than the first change amount when the engine operating state is the transient state and the load change rate is less than the threshold.

5 Claims, 4 Drawing Sheets

(56) References Cited

U.S. PATENT DOCUMENTS

| | | | | |
|---|---|---|---|---|
| 6,840,237 B2* | 1/2005 | Strom | ............... | F02B 1/12 |
| | | | | 123/679 |
| 2003/0204303 A1* | 10/2003 | Cullen | ............... | F02D 15/02 |
| | | | | 701/103 |
| 2005/0211207 A1* | 9/2005 | Urushihata | ............... | F01L 1/024 |
| | | | | 123/90.17 |
| 2011/0180047 A1* | 7/2011 | Yamakawa | ............... | F02B 1/12 |
| | | | | 123/564 |

FOREIGN PATENT DOCUMENTS

| | | |
|---|---|---|
| JP | 2013-142339 A | 7/2013 |
| JP | 2016-50502 A | 4/2016 |

* cited by examiner

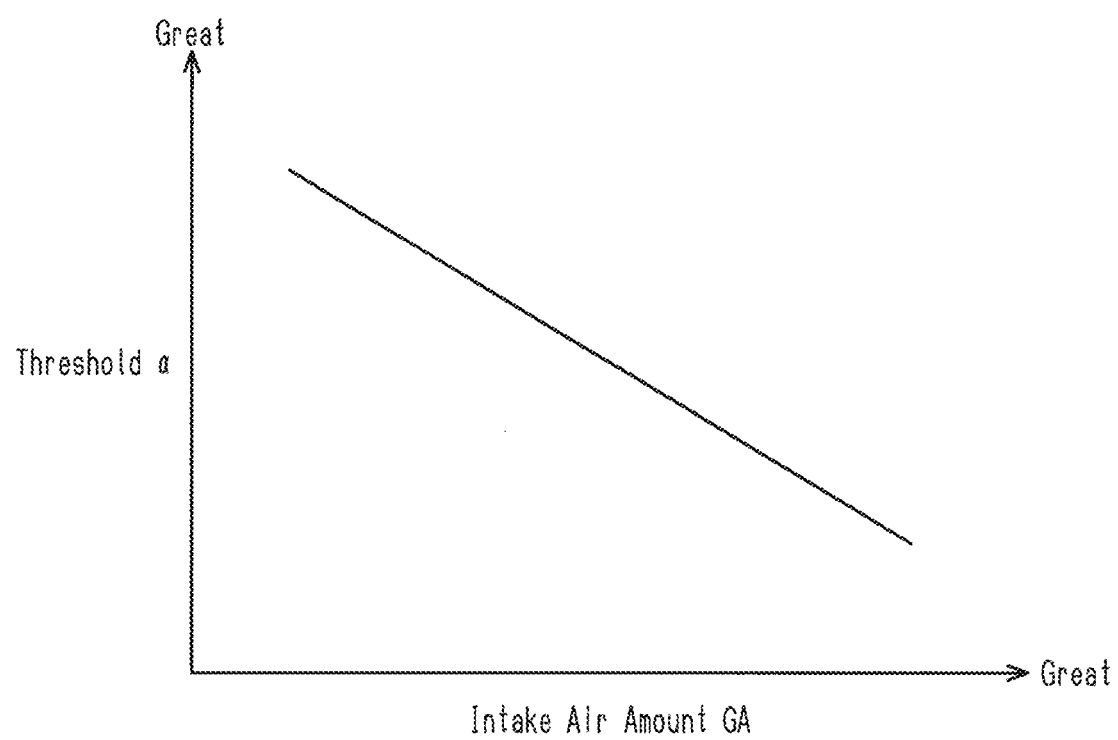

CONTROLLER FOR INTERNAL COMBUSTION ENGINE

RELATED APPLICATIONS

The present application claims priority of Japanese Application Number 2018-014056, filed on Jan. 30, 2018, the disclosure of which is hereby incorporated by reference herein in its entirety.

BACKGROUND

The present disclosure relates to a controller for an internal combustion engine.

A type of internal combustion engine has been known that is equipped with a variable valve actuation device that changes the valve timing of the intake valve by changing the phase of the intake camshaft with respect to the crankshaft.

The controller of such an internal combustion engine sets a target phase of the intake camshaft such that a required load (target load) calculated based on the engine operating state is achieved. For example, refer to Japanese Laid-Open Patent Publication No. 2013-142339.

The target phase may be set such that, when the engine operating state is a steady state, the target phase is set to a value that gives priority to fuel economy, and that, when the engine operating state is a transient state, the target phase is set to a value that gives priority to the output torque so as to quickly achieve the required load.

However, the actual output torque obtained when the target phase is set to a transient state phase varies depending on various factors (for example, calculation errors and aged deterioration of the components of the internal combustion engine). Thus, even when setting the target phase to a value that gives priority to the output torque during a transient state, the output torque may not increase so much and the fuel economy may deteriorate.

SUMMARY

An objective of the present disclosure is to provide a controller for an internal combustion engine capable of limiting deterioration of fuel economy when setting the target phase to a transient state phase.

To achieve the foregoing objective, a controller for an internal combustion engine is provided. The controller is adapted for an internal combustion engine equipped with a variable valve actuation device that changes a valve timing of an intake valve by changing a phase of an intake camshaft with respect to a crankshaft. The controlling section includes a controlling section configured to control the variable valve actuation device such that the phase becomes a target value. The controlling section is configured to execute a process of setting the target value to a steady state phase or a transient state phase, a process of calculating a load change rate, and a process of setting a change amount of the transient state phase. The controlling section is configured to execute: a process of increasing an output torque of the engine by setting the target value of the phase to a steady state phase when an engine operating state is a steady state or by setting the target value of the phase to a transient state phase that is displaced away from the steady state phase when the engine operating state is a transient state; a process of calculating a load change rate as a predicted value of an increase rate of an engine load when the transient state phase is changed by a first change amount; and a process of setting a change amount of the transient state phase to the first change amount when the engine operating state is the transient state and the load change rate is greater than or equal to a predetermined threshold or to a second change amount that is less than the first change amount when the engine operating state is the transient state and the load change rate is less than the threshold.

With this configuration, when the engine operating state is a transient state and the load change rate is greater than or equal to the threshold, the target phase (the target value of the above phase) is set to the transient state phase, which has been changed by the first change amount. This sets the target phase during a transition to a phase that gives priority to the output torque. When the target phase is set to a phase that gives priority to the output torque, the output torque of the engine increases until the target phase deviates to some extent from the steady state phase. Accordingly, the fuel economy deteriorates with such an increase in the output torque. However, as the output torque of the engine increases, the time taken by the actual engine load to reach the required load becomes shorter during a transition, so the transient characteristics are improved.

In contrast, when the engine operating state is a transient state and the load change rate is less than the threshold, the engine load (engine output torque) is not significantly increased even if the transient state phase is changed by the first change amount. In this state, the target phase is set to a transient state phase that has been changed by the second change amount, which is less than the first change amount. This prevents the target phase from being displaced away from the steady state phase. Therefore, deterioration of the fuel economy when setting the target phase to the transient state phase is limited.

In the above-described controller, the second change amount may be set to 0. In this case, since the transient state phase, which has been changed by the second change amount, becomes equal to the currently set target phase, the target phase is maintained as it is during the transition. This adequately prevents the target phase from being displaced away from the steady state phase.

In the above-described controller, the controlling section may be configured to execute a process of setting the target value of the phase to the steady state phase when the engine operating state is the transient state and the load change rate is a value indicating a decrease in the engine load.

With this configuration, when the load change rate is a value indicating a decrease in the engine load, that is, in a case in which the engine load decreases when the transient state phase is changed by the first change amount, the target phase is set to the steady state phase. In this way, the target phase rapidly returns to the steady state phase during a transition. This limits deterioration of the fuel economy due to the setting of the transient state phase.

In the above-described controller, the internal combustion engine may include a forced-induction device and a catalyst that purifies exhaust gas discharged to an exhaust passage. The controlling section may be configured to execute: a process of setting the transient state phase such that a valve overlap amount between the intake valve and an exhaust valve is greater when the engine operating state is the transient state than when the target value of the phase is set to the steady state phase; and a process of variably setting the threshold such that the greater an intake air amount, the smaller the threshold becomes.

The amount of unburned fuel discharged to the exhaust passage of the engine due to increase in the valve overlap amount increases as the intake air amount increases. Thus, the greater the intake air amount, the more likely it becomes that excessive rise of the catalyst temperature will occur due to the combustion of unburned fuel. Accordingly, as in this configuration, the threshold may be variably set such that the threshold decreases as the intake air amount increases. In this case, the load change rate is more likely to be determined to be less than the threshold when the engine operating state is a transient state. Thus, the target phase is likely to be set to a transient state phase that has been changed by the second change amount. When the target phase is set to a transient state phase that has been changed by the second change amount, the target phase is prevented from being displaced away from the steady state phase. This limits an increase in the valve overlap amount. Accordingly, the amount of unburned fuel discharged to the exhaust passage is limited, so that excessive increase in temperature of the catalyst is prevented.

The controlling section may be configured to execute, as a process of determining whether the engine operating state is a steady state or a transient state: a process of determining that the engine operating state is the transient state when a required load that is calculated based on the engine operating state is greater than or equal to an actual engine load; and a process of determining that the engine operating state is the steady state when the required load is less than the actual engine load.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 5 is a graph showing a manner in which a threshold is set in a modification of the embodiment.

DETAILED DESCRIPTION

A controller 100 for an internal combustion engine 1 according to an embodiment will now be described with reference to FIGS. 1 to 3.

Figure 1:
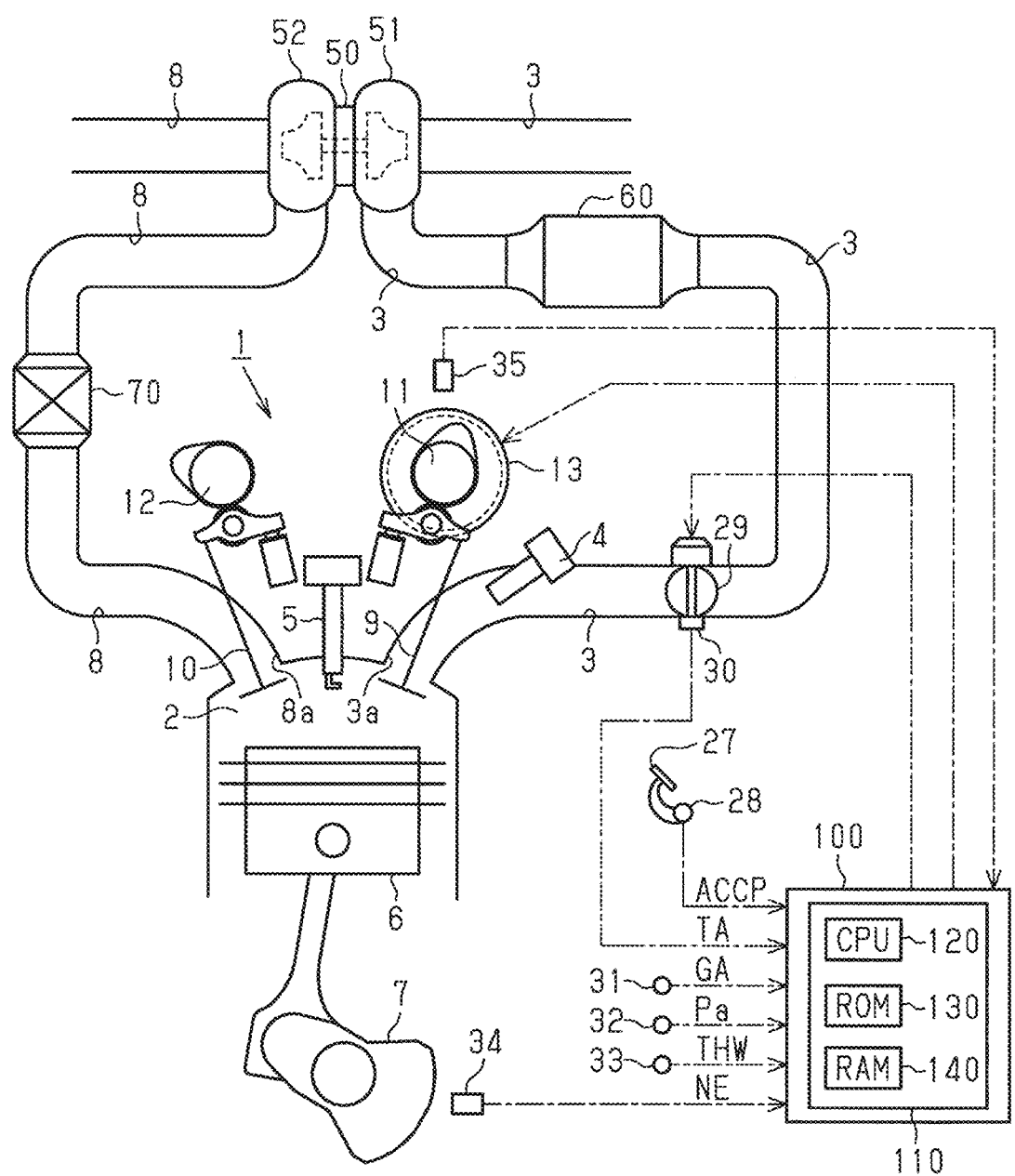
FIG. 1 is a schematic diagram of an internal combustion engine and a controller for an engine according to an embodiment.

As shown in FIG. 1, the internal combustion engine 1 draws in air to a combustion chamber 2 through an intake passage 3 and an intake port 3a and supplies fuel injected from a fuel injection valve 4 to the combustion chamber 2. When ignited by a spark plug 5, air-fuel mixture composed of air and fuel is burned to cause a piston 6 to reciprocate, which in turn rotates a crankshaft 7, which is the output shaft of the internal combustion engine 1. The air-fuel mixture after combustion is discharged as exhaust gas from the combustion chamber 2 to an exhaust passage 8.

In the intake passage 3 of the internal combustion engine 1, a throttle valve 29 that adjusts the amount of intake air is provided. The opening degree of the throttle valve 29 is adjusted by an electric motor.

The intake port 3a, which is connected to the intake passage 3, is provided with an intake valve 9. An exhaust port 8a, which is connected to the exhaust passage 8, is provided with an exhaust valve 10. The intake valve 9 and the exhaust valve 10 are opened and closed in accordance with rotation of an intake camshaft 11 and an exhaust camshaft 12, to which rotation of the crankshaft 7 is transmitted.

The intake camshaft 11 is equipped with a variable valve actuation device 13 that changes the valve timing (opening/closing timing) of the intake valve 9 by changing the phase of the intake camshaft 11 in relation to that of the crankshaft 7. In the following description, the phase of the intake camshaft 11 in relation to that of the crankshaft 7 is referred to as an intake valve phase.

A compressor housing 51 of a forced-induction device 50 is connected to a section of the intake passage 3 that is upstream of the throttle valve 29. The forced-induction device 50 supercharges intake air. An intercooler 60 is connected to a section of the intake passage 3 between the compressor housing 51 and the throttle valve 29. The intercooler 60 cools air that has been heated through supercharging.

A catalyst 70 that purifies exhaust gas discharged from the combustion chamber 2 is provided in the exhaust passage 8. A turbine housing 52 of the forced-induction device 50 is connected to a section of the exhaust passage 8 downstream of the catalyst 70.

The controller 100 is adapted for the internal combustion engine 1 and configured to control the internal combustion engine 1. More specifically, the controller 100 is configured to operate the portions to be operated such as the throttle valve 29, the fuel injection valve 4, the spark plug 5, and the variable valve actuation device 13, thereby controlling amounts to be controlled (intake air amount, fuel injection amount) of the internal combustion engine 1.

When controlling the controlled amounts, the controller 100 refers to an intake air amount GA detected by an air flowmeter 31, a throttle opening degree TA, which is the opening degree of the throttle valve 29 detected by a throttle sensor 30, a coolant temperature THW detected by a coolant temperature sensor 33, and an engine rotational speed NE calculated from an output signal Scr of a crank angle sensor 34. The controller 100 also refers to an output signal Sca of an intake cam angle sensor 35 that detects the rotation angle of the intake camshaft 11, and the intake pressure PM detected by an intake pressure sensor 32 provided in a section of the intake passage 3 between the throttle valve 29 and the intercooler 60. Also, the controller 100 refers to an output signal of an accelerator position sensor 28, which detects the operated amount of an accelerator pedal 27 (accelerator operation amount ACCP) operated by the driver of the vehicle. The controller 100 includes a CPU 120, a ROM 130, and a RAM 140 and executes control of the above-described controlled amounts by executing programs stored in the ROM 130 using the CPU 120. The controller 100 includes a controlling section 110, which is a functional section configured by the CPU 120, the ROM 130, the RAM 140, and the like, and is configured to control the variable valve actuation device 13 such that the intake valve phase becomes a target value.

As the valve timing control of the intake valve 9, the controlling section 110 calculates a target phase VTt, which is a target value of the intake valve phase, based on the engine rotation speed NE and an engine load KL. The controlling section 110 performs the drive control of the variable valve actuation device 13 such that an actual phase VTf, which is the actual value of the intake valve phase detected based on the output signal Scr of the crank angle sensor 34 and the output signal Sca of the intake cam angle sensor 35, becomes the target phase VTt. In the present embodiment, the state where the intake valve phase is the most retarded is defined as 0, and the valve timing of the intake valve 9 is changed by controlling the amount of advancement of the valve timing from the most regarded phase. The engine load KL is the ratio of the inflow air amount per combustion cycle of one cylinder to a reference inflow air amount. The reference inflow air amount is the inflow air amount per combustion cycle of one cylinder when the opening degree of the throttle valve 29 is maximized and it is variably set in accordance with the engine rotation speed NE. Also, the controller 100 of the present embodiment calculates the inflow air amount per combustion cycle of one cylinder using a known air model, which is the physical model of the intake system of the internal combustion engine 1. When calculating the inflow air amount, the controller 100 reads in the opening degree of the throttle valve 29, the intake valve phase, the intake pressure PM, the intake air amount GA, the engine rotational speed NE, and the like as input values of the air model.

Figure 2:
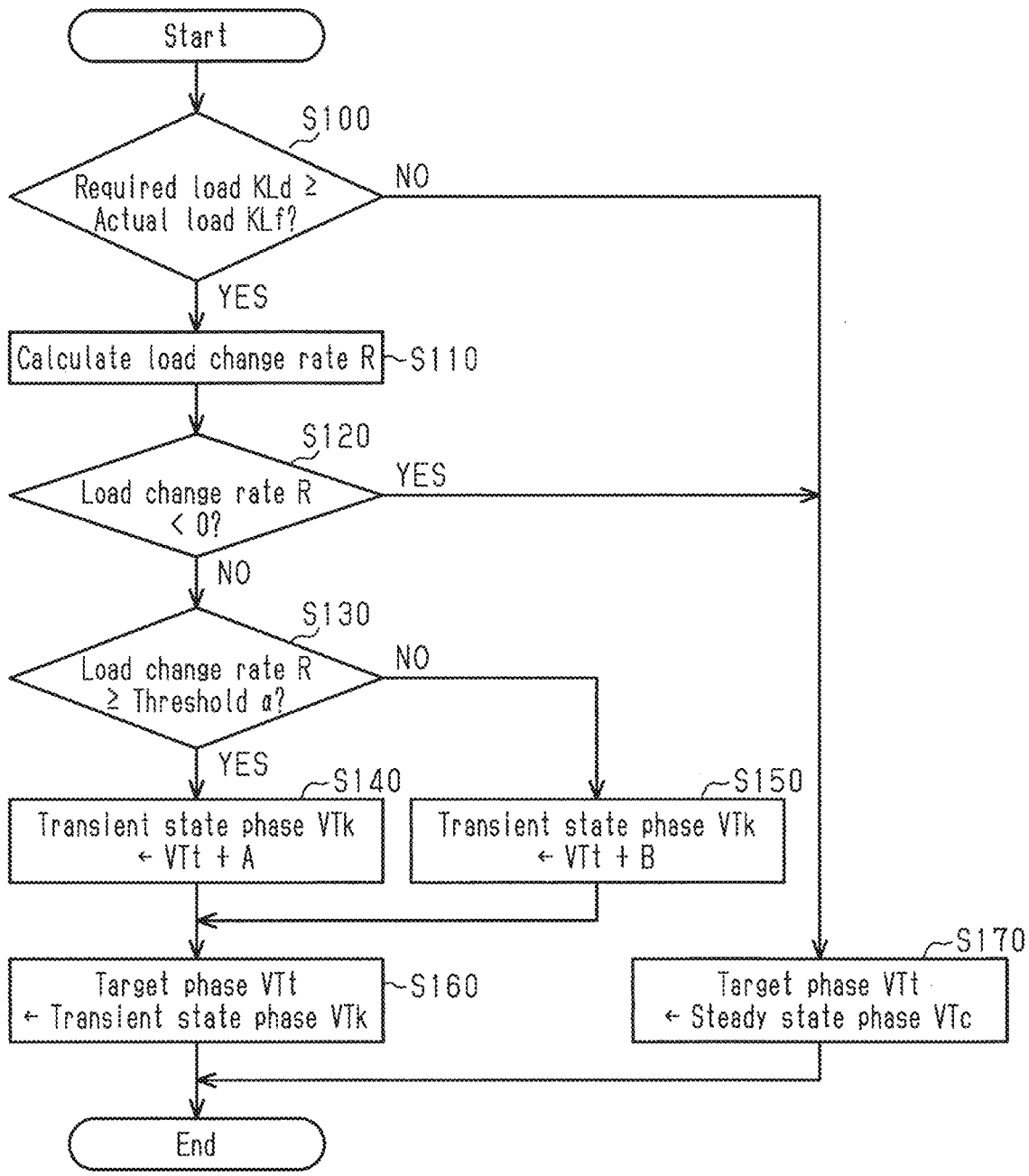
FIG. 2 is a flowchart showing the procedure for setting a target phase in the embodiment.

FIG. 2 shows the procedure of setting the target phase VTt executed by the controlling section 110 of the controller 100. The process shown in FIG. 2 is implemented by the CPU 120 executing programs stored in the ROM 130. The process shown in FIG. 2 is repeatedly executed at a predetermined interval. In the following description, the number of each step is represented by the letter S followed by a numeral.

When starting the process shown in FIG. 2, the controlling section 110 first determines whether a required load KLd is greater than or equal to an actual load KLf, which is the current engine load KL (S100). The required load KLd is a required value of the engine load KL (corresponding to the above-mentioned inflow air amount) calculated from the engine operating state such as the accelerator operation amount ACCP and the engine rotational speed NE.

When determining that the required load KLd is less than the actual load KLF (S100: NO), the controlling section 110 determines that the current engine operating state is a steady state, in which the engine load is constant, sets the target phase VTt to a steady state phase VTc, and temporarily ends the process. The steady state phase VTc is an intake valve phase that is variably set based on the engine rotation speed NE and the required load KLd, and gives priority to fuel economy so that the required load KLd can be achieved by the smallest possible amount of fuel.

In S100, if it is determined that the required load KLd is greater than or equal to the actual load KLf (S100: YES), the required load KLd has not reached the actual load KLF. In this case, the controlling section 110 determines that the current engine operating state is a transient state, in which the engine load is changing, and calculates a load change rate R (S110). The load change rate R is the value described below.

In the present embodiment, when the engine operating state is the transient state, the target value of the intake valve phase is set to a transient state phase VTk, which is displaced away from the steady state phase VTc, so that the output torque of the engine is increased. The load change rate R is calculated as a predicted value of the increase rate of the engine load when the transient state phase VTk is changed by a predetermined first change amount A during a transition. The load change rate R, and the following equation (1) shown below.

Load Change Rate $R=$(Predicted Load $KLa$−Current Actual Load $KLf$)/(First Change Amount $A$ of Transient State Phase $Vtk$)  (1)

Figure 3:
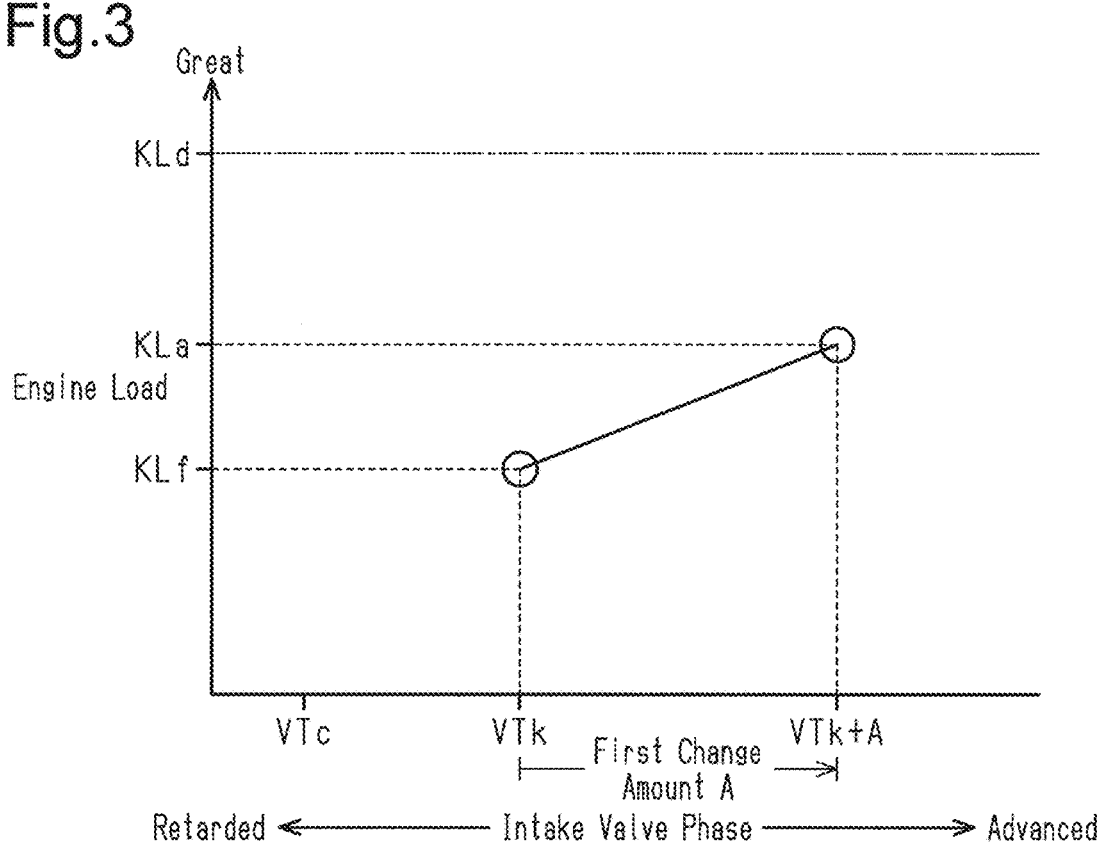
FIG. 3 is a graph showing a change in the engine load when the intake valve phase is changed in the embodiment.

As shown in FIG. 3, the predicted load KLa is an engine load KL that is predicted when the currently set transient state phase VTk is advanced by the first change amount A so that the actual phase VTf is advanced from the current value by the first change amount A. The controlling section 110 calculates the predicted load KLa using the above-described air model.

Then, the controlling section 110 determines whether the calculated load change rate R is less than 0 (S120). When the load change rate R is less than 0 and is a value indicating a decrease in the engine load (S120: YES), the controlling section 110 sets the target phase VTt to the steady state phase VTc (S170) and temporarily ends the current process.

In contrast, when the load change rate R is greater than or equal to 0 (S120: NO), the controlling section 110 determines whether the load change rate R is greater than or equal to a threshold α (S130). The threshold α is a fixed value that is set in advance such that, when the load change rate R is greater than or equal to the threshold α, it is possible to determine that the engine load (in other words, the output torque of the internal combustion engine 1) will be sufficiently increased if the valve timing of the intake valve 9 is changed by the first change amount A.

When the load change rate R is greater than or equal to the threshold α (S130: YES), the controlling section 110 calculates, as the new transient state phase VTk, a phase obtained by advancing the currently set target phase VTt by the first change amount A (S140). The controlling section 110 sets the target phase VTt to the calculated transient state phase VTk (S160) and temporarily ends the present process. In the present embodiment, each time the transient state phase VTk is updated in S140, the target phase VTt is advanced by the first change amount A.

In contrast, when the load change rate R is less than the threshold α (S130: NO), the controlling section 110 calculates, as the new transient state phase VTk, a phase obtained by advancing the currently set target phase VTt by a second change amount B, which is less than the first change amount A (S150). The controlling section 110 sets the target phase VTt to the calculated transient state phase VTk (S160). The process is then temporarily ended.

The second change amount B is a value set within a range that is greater than or equal to 0 and less than the first change amount A. In the present embodiment, the second change amount B is set to 0, for example. Therefore, when the transient state phase VTk is calculated in the process of S150, the currently set target phase VTt is maintained as it is.

An operation and advantages of the present embodiment will now be described.

Figure 4:
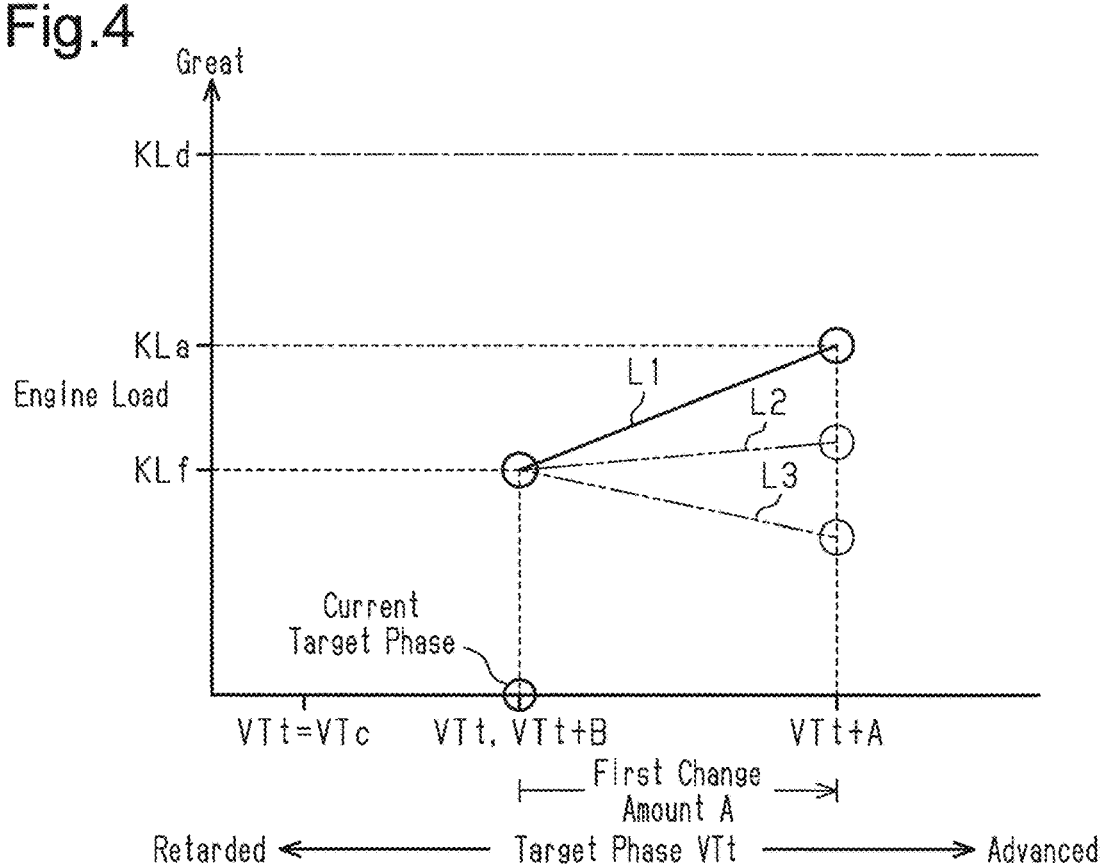
FIG. 4 is a graph showing a manner in which the target phase is set during a transition in the embodiment.

FIG. 4 shows a manner in which the target phase VTt is set when the engine operating state is a transient state.

(1) As indicated by the solid line L1 in FIG. 4, when the load change rate R is greater than or equal to the threshold α, the target phase VTt is set to the transient state phase VTk calculated in the process of S140 shown in FIG. 2. That is, a new value of the target phase VTt is set to a phase obtained by advancing the currently set target phase VTt by the first change amount A. Therefore, the actual phase VTf is also advanced by the first change amount A, so that the opening timing of the intake valve 9 is advanced. Accordingly, the valve overlap amount between the intake valve 9 and the exhaust valve 10 gradually increases. It is known that when the valve overlap amount increases, the internal combustion engine 1, equipped with the forced-induction device 50, increases the output torque during supercharging. In the present embodiment, the target phase VTt is advanced by the first change amount A at a time during a transition, so that the target phase VTt at the transition is set to a phase that gives priority to the output torque. When the target phase VTt is set to a phase that gives priority to the output torque, the output torque of the engine increases until the target phase VTt deviates to some extent from the steady state phase VTc. Accordingly, the fuel economy deteriorates with such an increase in the output torque. However, as the output torque of the engine increases, the time taken by the actual load KLf to reach the required load KLd becomes shorter, so the transient characteristics are improved.

(2) On the other hand, when the load change rate R is less than the threshold α as indicated by the long dashed double-short dashed line L2 in FIG. 4, the engine load (engine output torque) is not significantly increased even if the target phase VTt is changed by the first change amount A. In this case, there is a possibility that only the fuel economy may deteriorate without increase in the engine load. Therefore, in this state, the target phase VTt is set to the transient state phase VTk, which is calculated in the process of S150 shown in FIG. 2. That is, a new value of the target phase VTt is set to a phase obtained by advancing the currently set target phase VTt by the second change amount B. Since the second change amount B is set to 0, the currently set target phase VTt is maintained as it is when the load change rate R is less than the threshold α. This prevents the target phase VTt from being displaced away from the steady state phase VTc. Therefore, deterioration of the fuel economy when setting the target phase VTt to the transient state phase VTk is limited.

(3) In a transition, the target phase VTt is set to the transient state phase VTk, so the target phase VTt is displaced away from the steady state phase VTc and the valve overlap amount increases. When the load change rate R is less than the threshold α, the amount of unburned fuel discharged to the exhaust passage 8 increases as the valve overlap amount increases. Thus, for example, combustion of such unburned fuel can excessively increase the temperature of the catalyst 70. In this regard, in the present embodiment, when the load change rate R is less than the threshold α, the target phase VTt is set to the transient state phase VTk calculated in the process of S150 shown in FIG. 2. Thus, since the currently set target phase VTt is maintained as it is, the target phase VTt is prevented from being displaced away from the steady state phase VTc. This limits an increase in the valve overlap amount, thereby reducing the amount of unburned fuel discharged to the exhaust passage 8. Accordingly, excessive increase in temperature of the catalyst 70 is prevented.

(4) In contrast, when the load change rate R is less than 0 as indicated by the long dashed double-short dashed line L3 in FIG. 4, that is, in a case in which the engine load decreases when the target phase VTt is changed by the first change amount A, the target phase VTt is set to the steady state phase VTc by the process of S170 shown in FIG. 2. In this way, the target phase VTt rapidly returns to the steady state phase VTc during a transition. This limits deterioration of the fuel economy due to the setting of the transient state phase VTk.

The present embodiment may be modified as follows. The present embodiment and the following modifications can be combined as long as the combined modifications remain technically consistent with each other.

In the above-described embodiment, the threshold α is a fixed value. In contrast, the amount of unburned fuel discharged to the exhaust passage 8 due to increase in the valve overlap amount between the intake valve 9 and the exhaust valve 10 increases as the intake air amount GA increases. Thus, the greater the intake air amount GA, the more likely it becomes that excessive temperature rise of the catalyst 70 will occur due to the combustion of unburned fuel.

Accordingly, the threshold α may be variably set such that the threshold α decreases as the intake air amount GA increases, as shown in FIG. 5. In this case, since the threshold α decreases as the intake air amount GA increases, a negative determination is more likely to be made in S130 of FIG. 2. Thus, the transient state phase VTk by the process of S150 of FIG. 2 is more likely to be performed. When the target phase VTt is set to the transient state phase VTk calculated in the process of S150, the increase in the valve overlap amount is suppressed as described above. Accordingly, excessive increase in temperature of the catalyst 70 is adequately prevented.

In the above-described embodiment, the second change amount B is set to 0. However, the second change amount B may be set to a value greater than 0 and less than the first change amount A. Also in this modification, when the transient state phase VTk is set in the process of S150 of FIG. 2, the target phase VTt Is prevented from being displaced away from the steady state phase VTc, as compared with the case where the transient state phase VTk is set in the process of S140. Therefore, deterioration of the fuel economy is limited without increasing the engine load.

The above-described internal combustion engine 1 is provided with the forced-induction device 50. However, the present disclosure may be applied to an internal combustion engine that does not have such a forced-induction device 50. In short, the above-described embodiment may be modified as long as the target value of the intake valve phase is set to the transient state phase VTk, which is changed in a direction away from the steady state phase VTc when the engine operating state is the transient state.

The controller 100 is not limited to a device that includes the CPU 120 and the ROM 130 and executes software processing. For example, a dedicated hardware circuit (such as an ASIC) may be provided that executes at least part of the software processes executed in the above-described embodiment. That is, the controller 100 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Therefore, the present examples and embodiments are to be considered as illustrative and not restrictive and the disclosure is not to be limited to the examples and embodiments given herein.

The invention claimed is:

1. A controller for an internal combustion engine, the controller being adapted for an internal combustion engine equipped with a variable valve actuation device that changes a valve timing of an intake valve by changing a phase of an intake camshaft with respect to a crankshaft, wherein
the controller includes a controlling section configured to control the variable valve actuation device such that the phase becomes a target value, and
the controlling section is configured to execute
a process of increasing an output torque of the engine by setting the target value of the phase to a steady state phase when an engine operating state is a steady state or by setting the target value of the phase to a transient state phase that is displaced away from the steady state phase when the engine operating state is a transient state,
a process of calculating a load change rate as a predicted value of an increase rate of an engine load when the transient state phase is changed by a predetermined first change amount, and
a process of setting a change amount of the transient state phase to the first change amount when the engine operating state is the transient state and the load change rate is greater than or equal to a predetermined threshold or to a second change amount that is less than the first change amount when the engine operating state is the transient state and the load change rate is less than the threshold.

2. The controller for the internal combustion engine according to claim 1, wherein the second change amount is set to 0.

3. The controller for the internal combustion engine according to claim 1, wherein the controlling section is configured to execute a process of setting the target value of the phase to the steady state phase when the engine operating state is the transient state and the load change rate is a value indicating a decrease in the engine load.

4. The controller for the internal combustion engine according to claim 1, wherein
the internal combustion engine includes a forced-induction device and a catalyst that purifies exhaust gas discharged to an exhaust passage, and
the controlling section is configured to execute
a process of setting the transient state phase such that a valve overlap amount between the intake valve and an exhaust valve is greater when the engine operating state is the transient state than when the target value of the phase is set to the steady state phase, and
a process of variably setting the threshold such that the greater an intake air amount, the smaller the threshold becomes.

5. The controller for the internal combustion engine according to claim 1, wherein the controlling section is configured to execute
a process of determining that the engine operating state is the transient state when a required load that is calculated based on the engine operating state is greater than or equal to an actual engine load, and
a process of determining that the engine operating state is the steady state when the required load is less than the actual engine load.

* * * * *